UNITED STATES PATENT OFFICE.

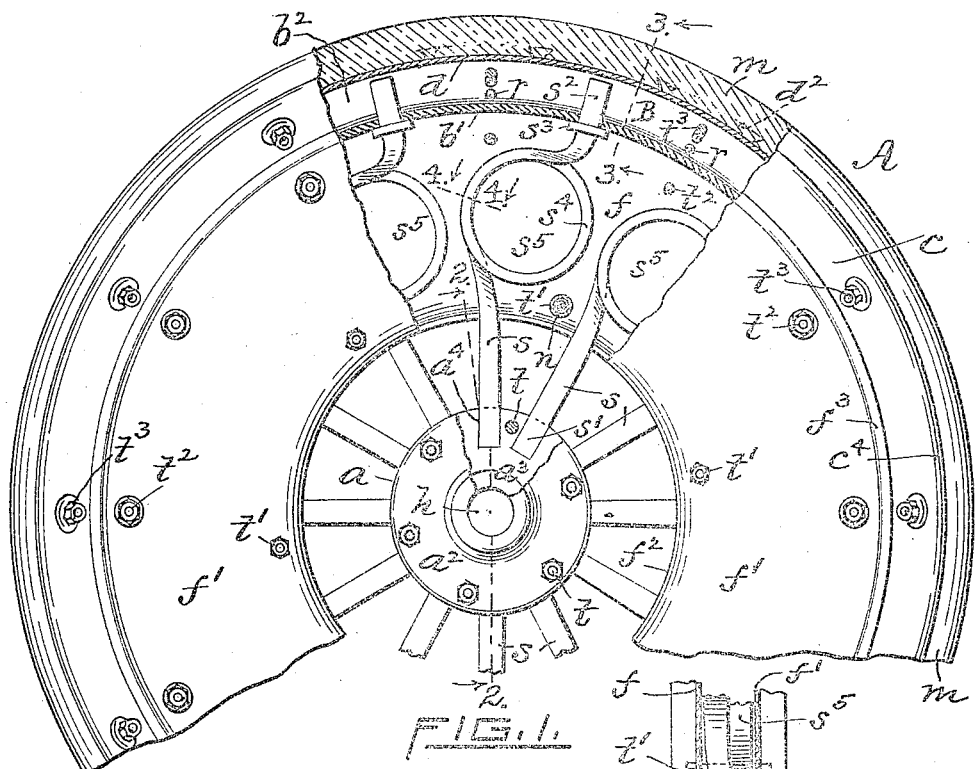

HERBERT G. MACKINNEY, OF PROVIDENCE, RHODE ISLAND.

RESILIENT VEHICLE-WHEEL.

No. 923,436.  Specification of Letters Patent.  Patented June 1, 1909.

Application filed November 11, 1907. Serial No. 401,607.

*To all whom it may concern:*

Be it known that I, HERBERT G. MACKINNEY, a citizen of the United States of America, and a resident of Providence, in the county of Providence and State of Rhode Island, have invented certain new and useful Improvements in Resilient Vehicle-Wheels, of which the following is a specification.

This invention relates to certain novel improvements in resilient vehicle-wheels, so-called; that is to say, wheels of the class in which the tire-carrying rim and the hub are connected together with a series of interposed peripherally spaced spring-spokes or other analogous members rigidly secured to the rim and hub, the arrangement being such that when the wheels are mounted on the axles and in normal action the hubs are capable of limited independent movement in vertical planes with respect to the non-yielding rims, the degree of said movement being determined by the weight or load in conjunction with the tension or resiliency of the spokes.

In my present invention the outer and inner end portions of the bent spring-spokes are inserted in correspondingly shaped openings or sockets formed in the rim and hub members respectively, and held in position therein by the resiliency of the spokes themselves.

The invention further consists in reducing the area of each spoke, cross-sectionally, at certain points so as to increase its resiliency, and in providing the wheel with oppositely arranged parallel outer side plates adapted to form auxiliary lateral supports for the spokes, all as more fully hereinafter set forth and claimed.

In the accompanying sheet of drawings, Figure 1 represents a front side elevation of a resilient vehicle-wheel embodying my improvements. Portions of the wheel being broken away to more clearly show the interior construction. Fig. 2 is a transverse sectional view taken on the irregular line 2 2 of Fig. 1. Fig. 3 is an enlarged cross-sectional view of the rim, &c., taken on line 3 3 of Fig. 1, and Fig. 4 is an enlarged transverse sectional view taken on line 4 4 of Fig. 1.

In my improved spring-wheel A, the hub $a$ may consist of the disk-like center part $a^3$ and the two end members $a^1$ $a^1$ fitted thereto and rigidly secured together by bolts $t$ passing through the flanges $a^2$ and said part $a^3$, as clearly shown in Fig. 2. The hub is bored longitudinally at $h$ or otherwise arranged to be revolubly mounted on an axle. As drawn, the thickness of the center member $a^3$ is just equal to that of the steel spokes $s$, soon to be described. These latter, being normally square cross-sectionally, have their inner or lower ends $s^1$ inserted and seated in peripherally spaced radial notches $a^4$ formed in said part $a^3$. See also Fig. 1.

The annular rim portion, B, represented more clearly in Fig. 3, has a suitable sheet-metal frame $b$, the same being trough-shaped cross-sectionally and provided with outwardly flaring sides $b^2$ $b^3$, integral with the bottom member $b^1$. The side $b^2$ terminates in the inwardly bent edge $b^4$. The opposite face of the rim has a counterpart but removable side flange member $c$, fitted to the adjacent face of said side $b^3$, and having a bent outer edge $c^4$. Bolts $t^3$ passing transversely through the parts, $b^2$, $b^3$ and $c$, serve to firmly clamp the whole together. At the base of the said bends, $b^4$, $c^4$, is fitted and snugly held therebetween a sheet-metal peripheral band $d$ having its edges $d^1$ bent at an angle to form an undercut space for the base of the endless annular rubber tire member $m$. Short lugs of studs $d^2$ secured to or integral with the band serve to maintain the tire in the proper normal relation, thus preventing any "creeping" movement. The said spring-spokes $s$, twelve in number as drawn, are uniform in shape and size. Each has its lower end portion $s^1$ inserted in the hub $a$, its upper or outer end portion, $s^2$, being inserted in an opening $s^6$ formed centrally in the base part $b^1$ of the sheet-metal frame $b$. A fixed collar $s^3$, or other analogous means, continuously bearing against said base part limits the length of the said inserted portion $s^2$. As drawn, the body part of the spoke, intermediate the said two end parts, is gradually reduced in thickness, as indicated say at $s^4$, and then bent to a coil form $s^5$, Fig. 1; the stock being also bent laterally so that said end portions will lie in a central plane. I prefer to have the parts $s^1$ $s^2$ of the spoke non-alining, or in other words if two radial lines be drawn extending from the center of the wheel the same would pass through the axes of said parts, the angle included between said lines not to extend beyond the periphery of the coil $s^5$.

In order to protect the spokes and also at the same time to form an auxiliary lateral support for them a pair of oppositely disposed parallel thin sheet-metal annular side plates, $f$, $f^1$, may be employed. The outer edge of plate $f$ is bent at an angle to fit the exterior of the adjacent side member $b^2$ of the rim and is secured to it by rivets $r$. The fellow plate $f^1$, is correspondingly bent at $f^3$ and bears against the member $c$. Bolts $t^2$ passing transversely through the plates firmly clamp the movable one, $f^1$, in position. See Fig. 3. The lower edge of each plate is bent inwardly (see $f^2$, Fig. 2) so as to just clear the adjacent sides of the spokes, a series of stay-bolts $t^1$, provided with tubular space members $n$, being employed to maintain the plates in proper relation.

The manner of assembling the several members of my improved spring-wheel A may be described as follows: The previously prepared rim part $b$ having the side plate $f$ secured thereto and the hub $a$ are first placed flatwise upon a suitable support or table and secured in position; the spokes $s$ are next seized singly by a suitable implement and held therein, at the same time contracting the spring-coil $s^3$ so that the two ends of the spoke may be inserted in the respective sockets or seats, the reaction causing the spoke to instantly become fully seated upon releasing it from the implement. After thus mounting the several spokes the annular tire-carrying band $d$ is placed in position in the rim, the follower plate $c$ replaced and all secured together by the series of bolts $t^3$; the final operation being to place the side plate $f^1$ in position and secure it in place by the two series of bolts, $t^1$ and $t^2$.

I claim as my invention and desire to secure by United States Letters Patent,—

1. In a vehicle-wheel of the character described, the combination of hub and rim members, each having a plurality of circumferentially spaced sockets the sockets of the rim member being located in advance of and in non-alinement or non-radial with the corresponding or fellow sockets of the hub, and resilient spokes bent to a spring form interposed between and connecting the said rim and hub members, and having the upper and bottom ends of the spokes seated in the respective sockets of said members and held in position therein solely by the resiliency of the spokes themselves.

2. In a vehicle-wheel of the character described, the combination of a hollow rim member having diverging side walls and upper and lower concentric annular walls uniting said side walls transversely and having said lower wall member provided with suitably spaced sockets, a rubber tire supported in said rim, a central hub member having circumferentially spaced sockets disposed with respect to the said sockets of the rim, a series of interposed bent spring-spokes having the upper and lower ends thereof seated in the respective sockets of the corresponding rim and hub members and held in position therein by the expansive force of the spokes, and a pair of oppositely disposed outer annular side plates secured to said rim and enveloping the major portion of the spokes, the inner edge of each plate being adapted to form a lateral brace or support for the spokes.

3. In a vehicle-wheel of the character described, the combination with its hub and rim members, of a series of spring-spokes removably seated in said members and being held in place therein by the spoke's resiliency, and having a portion of the stock of each spoke reduced in thickness and bent to a coil-form so as to increase its efficiency.

Signed at Providence, R. I., this 8th day of November, 1907.

HERBERT G. MACKINNEY.

Witnesses:
GEO. H. REMINGTON,
CHARLES C. REMINGTON.